(12) United States Patent
Islam et al.

(10) Patent No.: US 9,728,909 B2
(45) Date of Patent: Aug. 8, 2017

(54) HOUSING FOR BREAKOUT CORDS TERMINATED TO PLATES

(71) Applicant: CommScope Technologies LLC, Hickory, NC (US)

(72) Inventors: Nahid Islam, Westmont, IL (US); John T. Hanley, Orland Park, IL (US)

(73) Assignee: CommScope Technologies LLC, Hickory, NC (US)

(*) Notice: Subject to any disclaimer, the term of this patent is extended or adjusted under 35 U.S.C. 154(b) by 119 days.

(21) Appl. No.: 14/667,586

(22) Filed: Mar. 24, 2015

(65) Prior Publication Data

US 2015/0270654 A1 Sep. 24, 2015

Related U.S. Application Data

(60) Provisional application No. 61/969,529, filed on Mar. 24, 2014.

(51) Int. Cl.
*H01R 13/64* (2006.01)
*H01R 13/74* (2006.01)
*H01R 13/518* (2006.01)

(52) U.S. Cl.
CPC ........... *H01R 13/74* (2013.01); *H01R 13/518* (2013.01); *H01R 13/64* (2013.01); *H01R 13/746* (2013.01)

(58) Field of Classification Search
CPC ....... H01R 13/64; H01R 13/74; H01R 13/746
USPC ...................................................... 385/135
See application file for complete search history.

(56) References Cited

U.S. PATENT DOCUMENTS

| 4,424,412 A * | 1/1984 | Goetter ............... H02G 15/013 174/77 R |
| 4,558,174 A * | 12/1985 | Massey ............... G02B 6/4447 174/78 |
| 5,092,792 A | 3/1992 | Nilsson |

(Continued)

FOREIGN PATENT DOCUMENTS

| JP | 05217629 | 8/1993 |
| KR | 10-2007-0005119 A | 1/2007 |
| WO | WO 2007/126459 A3 | 11/2007 |

*Primary Examiner* — Briggitte R Hammond
(74) *Attorney, Agent, or Firm* — Myers Bigel, P.A.

(57) ABSTRACT

A mounting system for facilitating ordered mating of plural connectors includes a first plate having plural mounting positions for first connectors. A second plate is attached to the first plate by a standoff. A housing extends between the first and second plates and substantially covers an area between the first and second plates. In a keying embodiment, each mounting position has an inner perimeter shape different than the others. Each connector of plural first connectors includes a threaded portion holding a first nut with an outer perimeter having a shape unique as compared to the other first nuts. The outer perimeter of the first nut seats into one, and only one, of the plural mounting positions. A third plate is mounted to and spaced from the first plate. The third plate includes plural keyholes which are aligned to the plural mounting positions. Each keyhole has an inner perimeter shape matching the inner perimeter shape of the mounting position to which the keyhole is aligned. The keyholes only permit a second connector, with a matching key nut, to pass therethrough and mate into the first connector in the aligned mounting position.

14 Claims, 10 Drawing Sheets

(56) References Cited

U.S. PATENT DOCUMENTS

| | | | |
|---|---|---|---|
| 5,245,133 A * | 9/1993 | DeCarlo | H02G 15/113 174/76 |
| 5,251,373 A * | 10/1993 | DeCarlo | H02G 1/14 156/48 |
| 5,446,823 A * | 8/1995 | Bingham | G02B 6/4422 174/93 |
| 5,631,993 A * | 5/1997 | Cloud | G02B 6/4446 385/135 |
| 5,658,166 A | 8/1997 | Freeman | |
| 5,793,921 A * | 8/1998 | Wilkins | G02B 6/4446 174/77 R |
| 6,051,792 A * | 4/2000 | Damm | H02G 15/007 174/92 |
| 6,231,051 B1 * | 5/2001 | Mueller | H02G 15/013 174/21 R |
| 6,242,700 B1 * | 6/2001 | Smith | H02G 15/013 174/77 R |
| 6,343,440 B1 | 2/2002 | Ayers | |
| 6,721,483 B2 * | 4/2004 | Grubish | G02B 6/4444 174/92 |
| 6,872,891 B2 | 3/2005 | Angele | |
| 6,918,786 B2 | 7/2005 | Barker et al. | |
| 6,981,893 B2 | 1/2006 | Barker et al. | |
| 7,022,916 B1 | 4/2006 | Cavanaugh | |
| 7,220,062 B2 | 5/2007 | Durrant et al. | |
| 7,241,170 B1 | 7/2007 | Lindner et al. | |
| 7,303,432 B1 | 12/2007 | Chen et al. | |
| 7,316,518 B2 * | 1/2008 | Sasaki | H02G 15/013 174/88 R |
| 7,344,407 B1 | 3/2008 | Chen | |
| 7,521,634 B2 | 4/2009 | Clem et al. | |
| 7,598,457 B2 | 10/2009 | Allen et al. | |
| 7,635,273 B2 | 12/2009 | Buzil et al. | |
| 7,641,514 B2 | 1/2010 | Chen et al. | |
| RE42,970 E | 11/2011 | Fournier | |
| 8,353,724 B2 | 1/2013 | Shi et al. | |
| 8,513,543 B1 | 8/2013 | Lin | |
| 8,585,437 B2 | 11/2013 | Lin | |
| 8,744,228 B2 * | 6/2014 | Womack | G02B 6/4471 385/135 |
| 8,839,594 B2 * | 9/2014 | Smith | H02G 3/083 174/50 |
| 2003/0148794 A1 | 8/2003 | Wilson, Jr. | |
| 2004/0156611 A1 * | 8/2004 | Cloud | G02B 6/4444 385/135 |
| 2005/0164548 A1 | 7/2005 | Spears et al. | |
| 2006/0172578 A1 | 8/2006 | Parsons | |
| 2006/0291792 A1 * | 12/2006 | Vo | G02B 6/4475 385/135 |
| 2007/0047895 A1 * | 3/2007 | Parikh | G02B 6/4442 385/135 |
| 2008/0214045 A1 | 9/2008 | Tu et al. | |
| 2009/0046985 A1 | 2/2009 | Gronvall et al. | |
| 2009/0074369 A1 | 3/2009 | Bolton et al. | |
| 2009/0239413 A1 | 9/2009 | Milette | |
| 2009/0269977 A1 | 10/2009 | Chen et al. | |
| 2010/0181099 A1 | 7/2010 | Kameda et al. | |
| 2010/0290746 A1 | 11/2010 | Bran de Leon et al. | |
| 2012/0087628 A1 | 4/2012 | Bran de Leon et al. | |
| 2012/0231320 A1 | 9/2012 | Heck et al. | |
| 2013/0014974 A1 * | 1/2013 | Burke | H02G 15/013 174/135 |
| 2013/0294738 A1 | 11/2013 | Simmons et al. | |
| 2014/0153876 A1 * | 6/2014 | Dendas | G02B 6/4471 385/76 |
| 2014/0367163 A1 | 12/2014 | Islam | |
| 2015/0378122 A1 * | 12/2015 | Simmons | H01R 27/02 439/529 |

\* cited by examiner

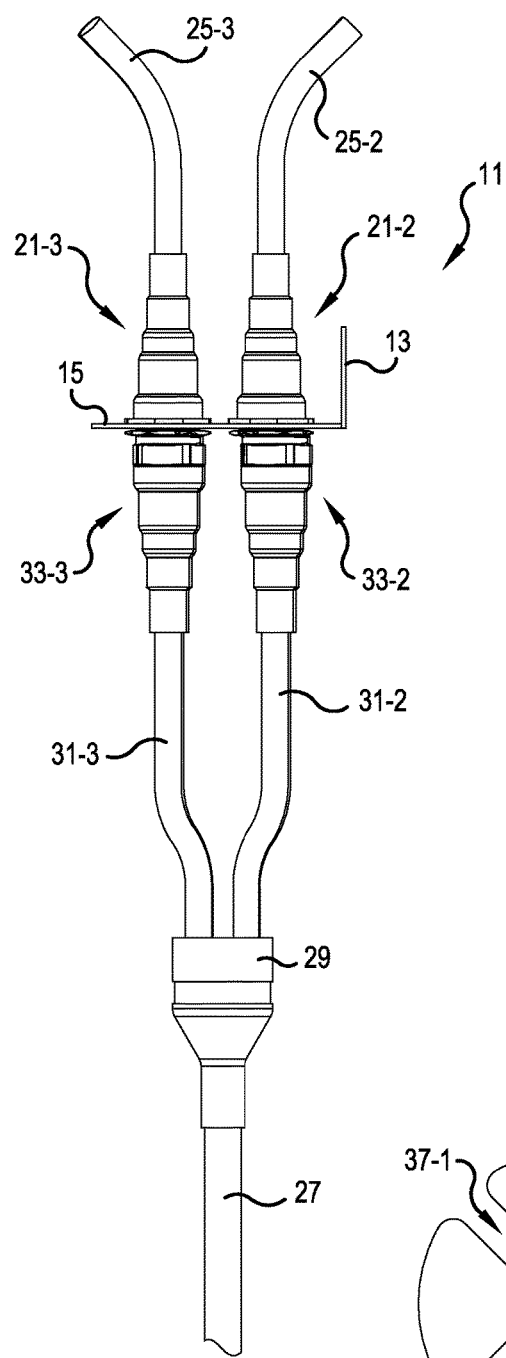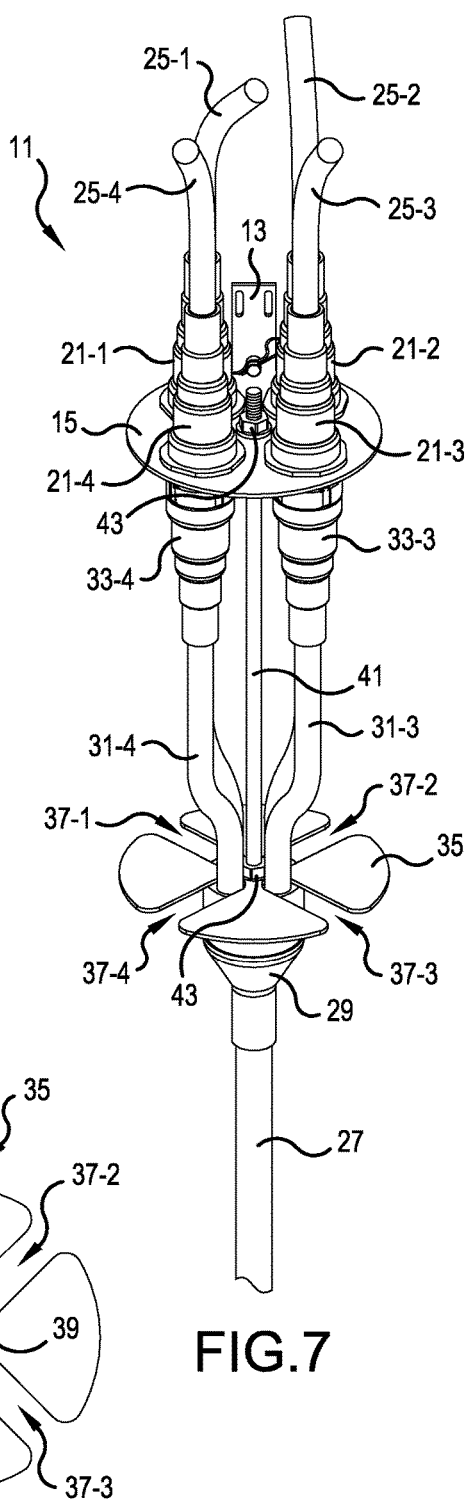
FIG.5
FIG.6
FIG.7

HOUSING FOR BREAKOUT CORDS TERMINATED TO PLATES

This application claims the benefit of U.S. Provisional Application No. 61/969,529, filed Mar. 24, 2014, the entire contents of which are herein incorporated by reference. This application is related to Applicant's co-pending U.S. application Ser. No. 14/667,578, filed Mar. 24, 2015, titled "PLATE FOR CABLE CONNECTOR ATTACHMENTS," the entire contents of which are herein incorporated by reference.

BACKGROUND OF THE INVENTION

1. Field of the Invention

The present invention relates to a mount system for facilitating ordered mating of plural connectors. More particularly, the present invention relates to a mounting system having a housing to protect a breakout section of a trunk cable, where the breakout section terminates to second connector, which may optionally mate to first connectors in keyed manner.

2. Description of the Related Art

A box unit for connecting jumper cables to trunk cables is known in the prior art of antenna tower wiring systems.

SUMMARY OF THE INVENTION

One type of connector, which may benefit from the present invention, is the type of mated connectors which exist between the jumper cords (extending up the antenna structure to the remote radio units) and a trunk cable, which extends down a tower to ground level equipment of the service provider. These connectors may be hybrid connectors (having both fiber and electrical elements). Alternatively, each connector may present only fiber connections or only electrical connections. Specific functions, like an alarm function, may be dedicated to its own keyed or non-keyed connector. Connector moutning structures to achieve these and other objects are taught in the present disclosure.

There is typically a transition where the trunk cable transitions into several terminated breakout cords. The transition is exposed to the sun and weather elements, and may crack and leak water into the trunk cable. The smaller jackets of the breakout cords tend to be fabricated in a less robust manner, as compared to the large jacket of the trunk cable. This may lead to the smaller breakout cords being more susceptible to damage from birds and rodents. Further, the breakout cords may appear to birds to be small evenly spaced branches, which might be highly suitable for nesting. Birds may tend to nest on top of the transition, which can lead to damage and higher wind loads.

The Applicant has appreciated a need for a connection structure and mounting system, which is simpler in design and less costly to manufacture, and which can protect the breakout cords leaving the transition. The Applicant has also appreciated a need for a design with an inexpensive keying system to simplify the assembly procedures in the field, making the connection process rather foolproof, such that jumper cords and breakout cords may only be connected in the proper manner.

In accordance with the present invention, a mounting system for facilitating ordered mating of plural connectors includes a first plate having plural mounting positions for first connectors. A second plate is attached to the first plate by a standoff. A housing extends between the first and second plates, and substantially covers an area between the first and second plates.

In an optional keying embodiment, each mounting position has an inner perimeter shape different than the others. Each connector of plural first connectors includes a threaded portion holding a first nut with an outer perimeter having a shape unique as compared to the other first nuts. The outer perimeter of the first nut seats into one, and only one, of the plural mounting positions. A third plate is mounted to and spaced from the first plate. The third plate includes plural keyholes, which are aligned to the plural mounting positions. Each keyhole has an inner perimeter shape matching the inner perimeter shape of the mounting position to which the keyhole is aligned. The keyholes only permit a second connector, with a matching key nut, to pass therethrough and mate into the first connector in the aligned mounting position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is a side view of the second connectors of FIG. 4 mated to the first connectors of FIGS. 2-3;

FIG. 6 is a top view of a second plate;

FIG. 7 is a top perspective view of the second plate of FIG. 6 installed within the breakout cords of FIG. 5;

DETAILED DESCRIPTION OF EMBODIMENTS OF THE INVENTION

Figure 1:
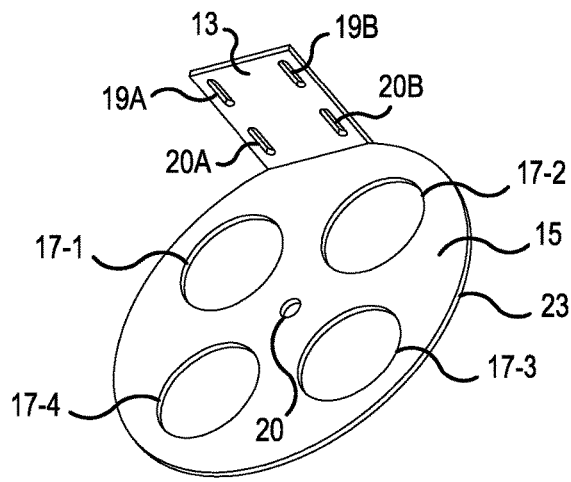
FIG. 1 is a top perspective view of a first plate for use in a mounting system for holding connectors, in accordance with a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIGS. 1-8 show a first embodiment of a mounting system 11 for facilitating ordered mating of plural connectors. FIG. 1 is a top perspective view of an upper structure use in the mounting system. A bracket 13 having at least one feature for securing the bracket 13 to a pole or wall is attached to a first plate 15, e.g., directly connected to, or formed integrally with, the first plate 15. The first plate 15 presents a generally circular outer perimeter 23. The plate 15 has plural mounting positions 17-1, 17-2, 17-3 and 17-4 for securing plural first connectors 21-1, 21-2, 21-3 and 21-4 (See FIG. 2) and a centrally located first through hole 20. Although four mounting positions 17 are shown in FIGS. 1-3, 7 and 8, more or fewer mounting positions 17 may be included in the plate 15 to accommodate more or fewer first connectors 21.

Figure 13:
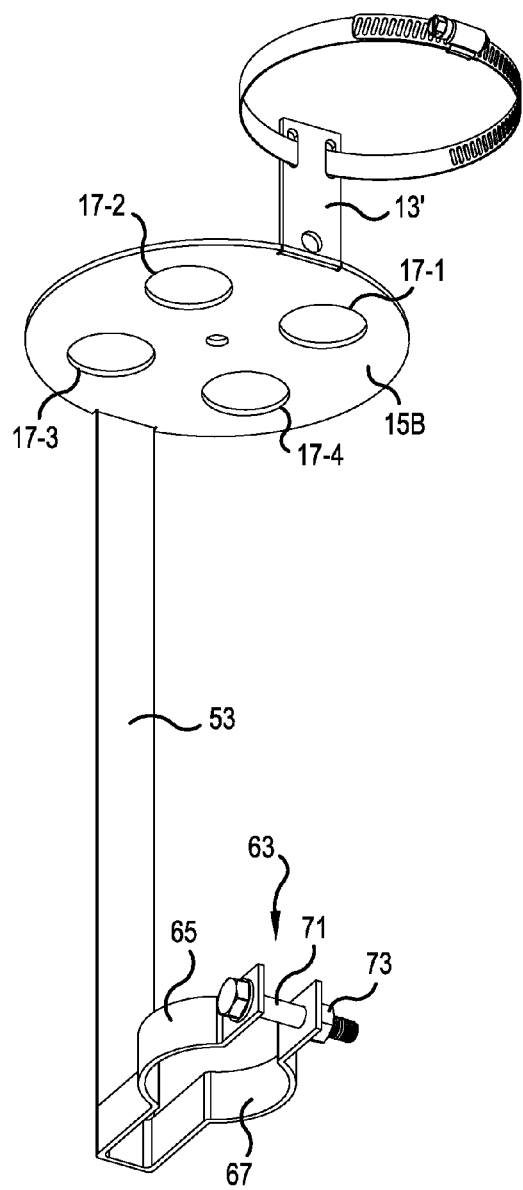
FIG. 13 is a bottom perspective view of a mounting system for holding connectors, in accordance with a third embodiment of the present invention.

In one embodiment, the at least one feature for securing the bracket 13 to a pole or wall includes two through holes or channels 19A and 19B formed in an upper area of the bracket 13 and at least two through holes or channels 20A and 20B formed in a lower area of the bracket 13. A first hose clamp (as illustrated in FIG. 13) may be passed through the through holes or channels 19A and 19B, and a second hose clamp (as illustrated in FIG. 13) may be passed through the through holes or channels 20A and 20B. However, it would be possible to use other fixing structures, such as a plate and threaded rods, or two C-clamps with treaded ends passing through each set of the through holes or channels 19A/B and 20A/B, and nuts attached to the threaded ends.

Figure 2:
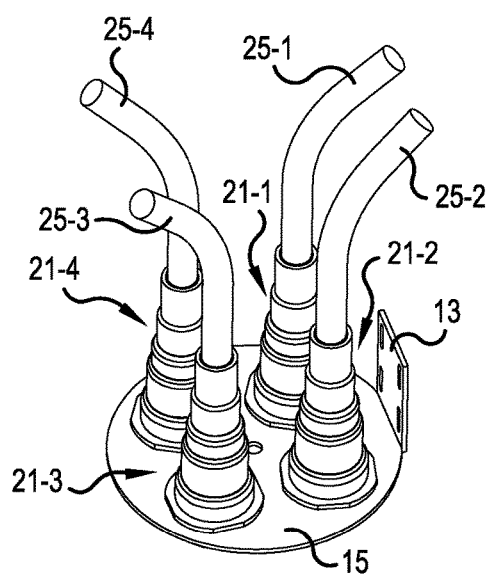
FIG. 2 is a top perspective view of the first plate of FIG. 1 with first connectors mounted thereto.
Figure 3:
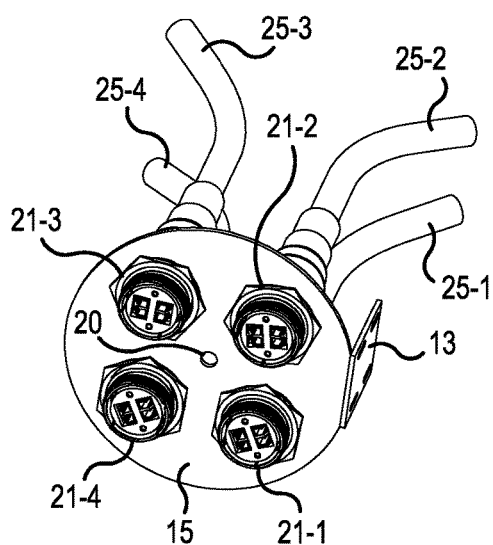
FIG. 3 is a bottom perspective view of the first plate of FIG. 2.

FIGS. 2 and 3 are top and bottom perspective views, respectively, of the first plate of FIG. 1 with the first connectors 21-1, 21-2, 21-3 and 21-4 fixed in the mounting positions 17-1, 17-2, 17-3 and 17-4. In a typical arrangement, the plurality of first connectors 21-1, 21-2, 21-3 and 21-4 are attached to first cords 25-1, 25-2, 25-3 and 25-4, respectively, which each extend to equipment mounted proximate a top of a tower structure, such as remote radio units (RRUs).

Figure 4:
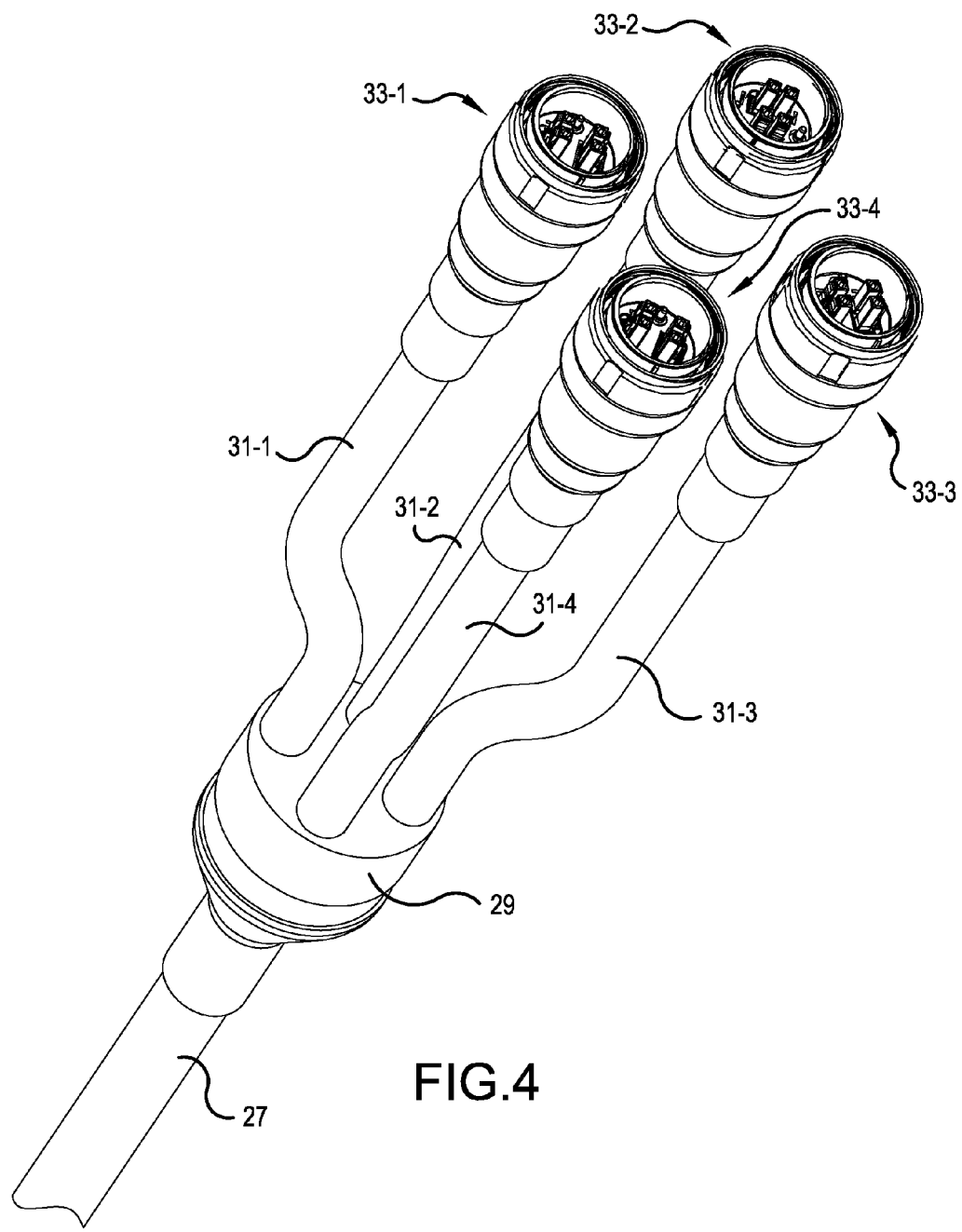
FIG. 4 is a top perspective view of a trunk cable, a transition, and breakout cords terminated to second connectors.

FIG. 4 is a top perspective view of a trunk cable 27, which passes into a transition 29. Within the transition 29, optical fibers and/or electrical conductors are broken out of the trunk cable 27 and passed into smaller jacketed, breakout cords 31-1, 31-2, 31-3 and 31-4. The breakout cords 31-1, 31-2, 31-3 and 31-4 are terminated to second connectors 33-1, 33-2, 33-3 and 33-4. The trunk cable 27 is routed to service provider equipment located proximate a bottom of the tower structure. As best seen in FIG. 5, the second connectors 33-1, 33-2, 33-3 and 33-4 are mated to the first connectors 21-1, 21-2, 21-3 and 21-4 on a lower side of the first plate 15.

FIG. 6 is a top view of a second plate 35. The second plate 35 has first, second, third and fourth openings or channels 37-1, 37-2, 37-3 and 37-4 to permit the breakout cords 31-1, 31-2, 31-3 and 31-4 to pass therethrough. A center of the second plate 35 includes a second through hole 39.

FIG. 7 is a top perspective view of the second plate 35 of FIG. 6 installed within the breakout cords 31 of FIG. 5. The second plate 35 is attached to the first plate 15 by a standoff. The standoff, in the form of a rod 41, passes through the first through hole 20 and the second through hole 39. The ends of the rod 41 are threaded and may include nuts 43 attached to the upper threaded end of the rod 41 on opposite sides of the first plate 15 to attach the rod 41 to the first plate 15. The lower threaded end of the rod 41 may pass through the second through hole 39 and screw directly into a threaded opening formed in the top center of the transition 29. The lower threaded end may also include a nut 43 to attach the lower threaded end to the second plate 35 and/or the transition 29. By this arrangement, the second plate 35 is spaced from the first plate 15 by the rod 41.

Figures 8, 9:
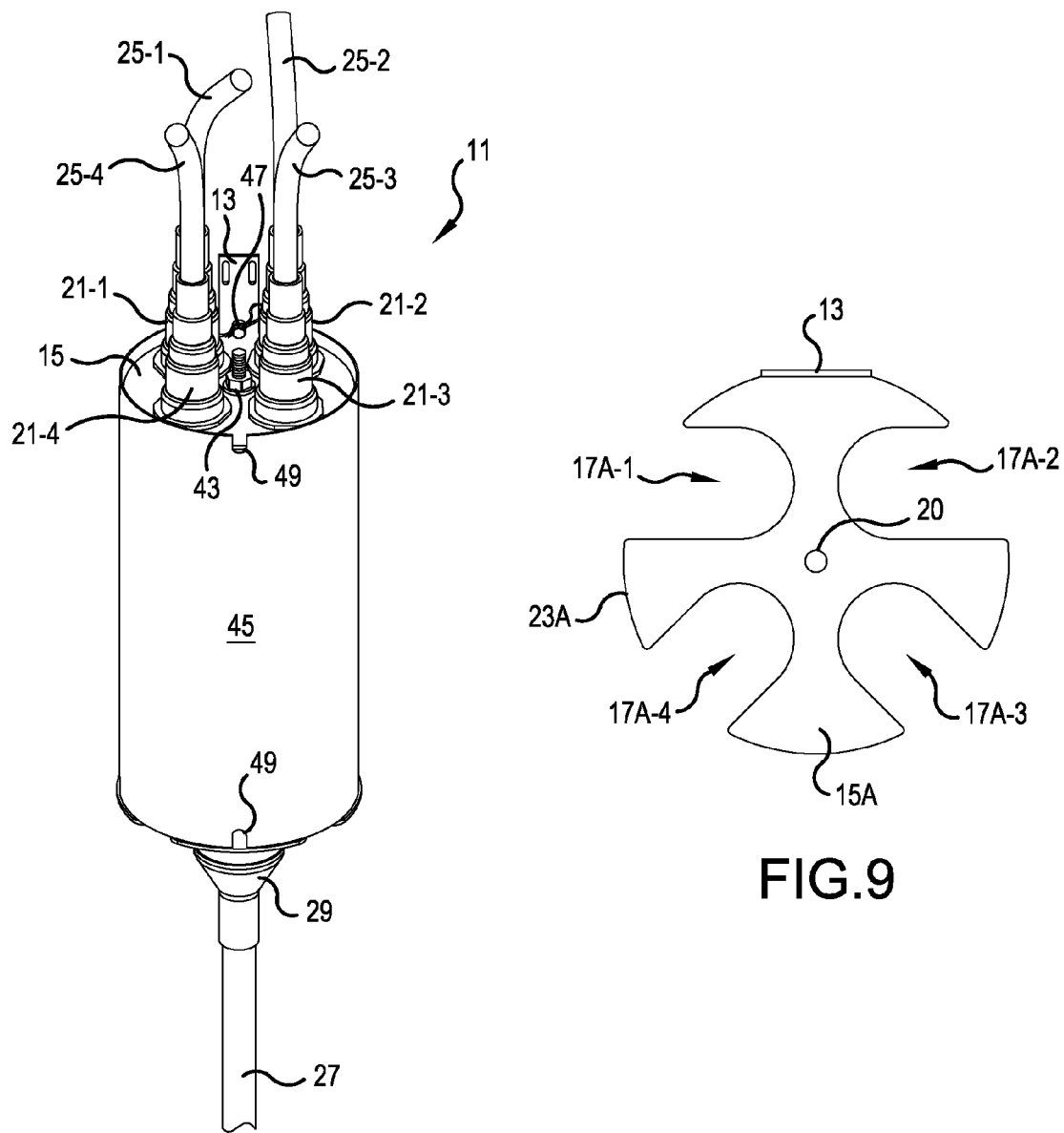
FIG. 8 is the same top perspective view of FIG. 7, but showing a housing mounted to the first and second plates.
FIG. 9 is a top view of an alternative first plate, in accordance with the present invention.

FIG. 8 is the same top perspective view of FIG. 7, but includes a housing 45 mounted to the first and second plates 15 and 35. The housing 45 is formed as a cylinder with a first open end proximate the first plate 15 and a second open end proximate the second plate 35. The housing 45 extends between the first and second plates 15 and 35, and substantially covers an area between the first and second plates 15 and 35. In practice, the housing 45 may be attached to the first and second plates 15 and 35 by screws 47 and/or abutment tabs 49.

Although FIGS. 1-3, 5 and 7-8 have illustrated the bracket 13 as being attached to the first plate 15, this is not required. Because the first plate 15 is attached to the housing 45 and to the second plate 35, the bracket 13 may be attached to the first plate 15, the second plate 35 or the housing 45.

FIG. 9 is a perspective view of a modified first plate 15A in accordance with the first embodiment. The modified plate 15A does not include the mounting positions 17-1, 17-2, 17-3 and 17-4 formed as circular through holes. Rather, the mounting positions 17A-1, 17A-2, 17A-3 and 17A-4 are formed as channels, opening to an outer periphery 23A of the first plate 15A. The channels format may assist or simplify the mounting of the first connectors 21-1, 21-2, 21-3 and 21-4 into the mounting positions 17A-1, 17A-2, 17A-3 and 17A-4. With the mounting of the housing 45 to the first plate 15A the open ends of the mounting positions 17A-1, 17A-2, 17A-3 and 17A-4 are essentially closed by the upper perimeter edge of the housing 45.

Figure 12:
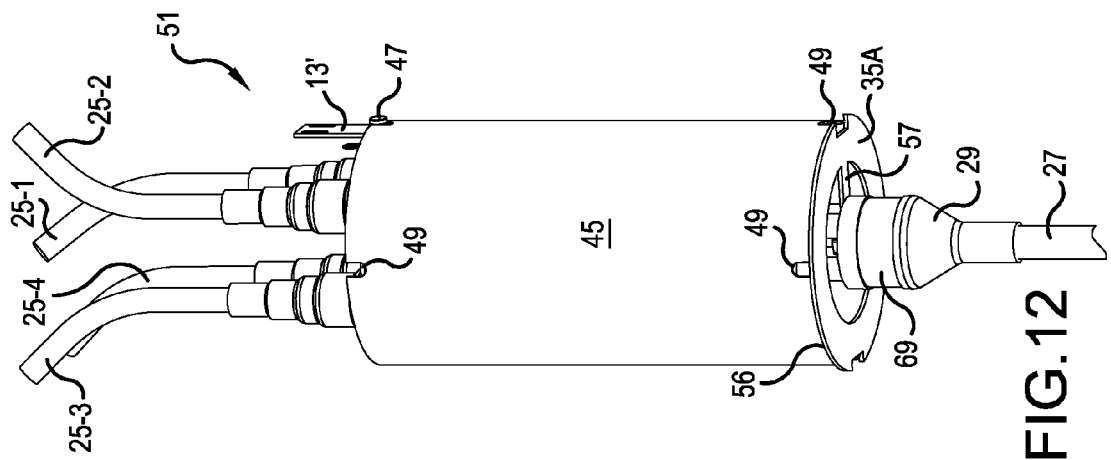
FIG. 12 is a bottom perspective view of the mounting system of FIG. 11, but showing the housing mounted to the first and second plates.
Figure 11:
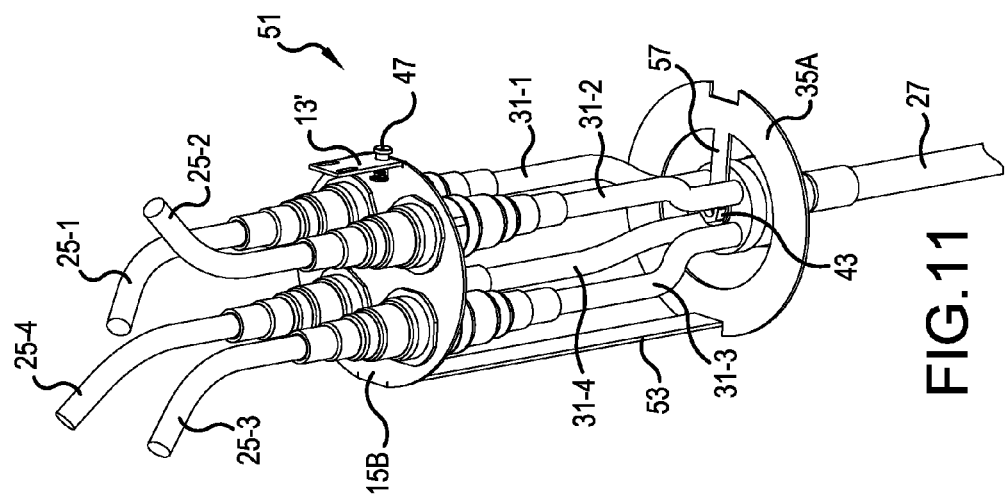
FIG. 11 is a top perspective view of the mounting system of FIG. 10, but with the first connectors mounted to the first plate and the second connectors mated to the first connectors.
Figure 10:
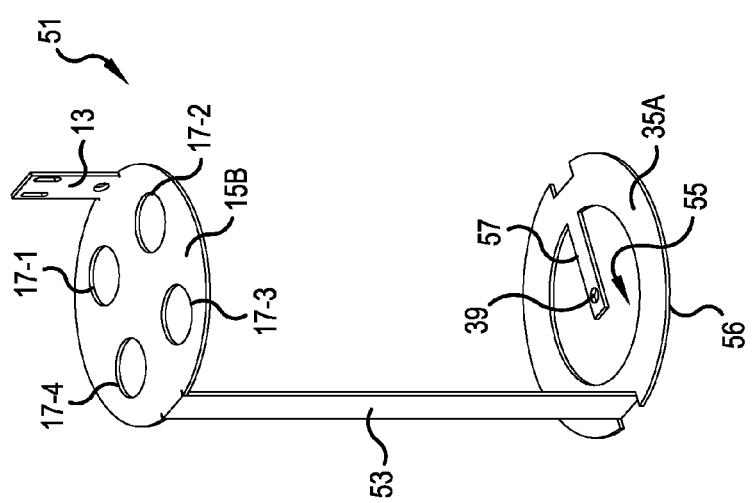
FIG. 10 is a top perspective view of a mounting system for holding connectors, in accordance with a second embodiment of the present invention.

FIGS. 10-12 are perspective views of a mounting system 51 in accordance with a second embodiment. The mounting system 51 is the same as the mounting system 11 of FIGS. 1-8, except for two modifications.

First, the rod 41, which functions as a standoff, has been replaced by a beam 53. The beam 53 is attached to a perimeter edge of the first plate 15B and a perimeter edge of the second plate 35A. In a preferred embodiment, the bracket 13, the first plate 15B, the beam 53 and the second plate 35A are formed from a single, unitary sheet of metal, e.g., by stamping. Then, the junctions residing between the beam 53 and the first and second plates 15B and 35A are bent to a ninety degree angle to distinguish the first plate 15B from the beam 53, and to distinguish the beam 53 from the second plate 35A. Further, the junction between the bracket 13 and the first plate 15B is bent to a ninety degree angle.

Second, the shape of the second plate 35A has been modified. The first, second, third and fourth openings or channels 37-1, 37-2, 37-3 and 37-4 have been removed, and replaced by a large C-shaped opening 55. The outer perimeter 56 of the second plate 35A is essentially circular. A plank 57 extends to a center of the second plate 35A and has the second through hole 39 formed therein.

As best seen in FIG. 11, a threaded fastener, e.g., a threaded rod with a nut 43, may be passed through the second through hole 39 and engaged into the transition 29 in order to attach the second plate 35A to a top of the transition 29. The breakout cords 31-1, 31-2, 31-3 and 31-4 are routed through the opening 55, and the second connectors 33-1, 33-2, 33-3 and 33-4 are mated to the first connectors 21-1, 21-2, 21-3 and 21-4 on a lower side of the first plate 15B.

As best seen in FIG. 12, the housing 45 is mounted to the first and second plates 15B and 35A. The housing 45 extends between the first and second plates 15B and 35A, and substantially covers an area between the first and second plates 15B and 35A. In practice, the housing 45 may be attached to the first and second plates 15B and 35A and/or the beam 53 by screws 47 and/or abutment tabs 49.

Although FIGS. 10-12 have illustrated the bracket 13 as being attached to the first plate 15B, this is not required. Because the first plate 15B is attached to the housing 45 and the second plate 35A, the bracket 13 may be attached to the first plate 15B, the second plate 35A or the housing 45.

Figure 14:
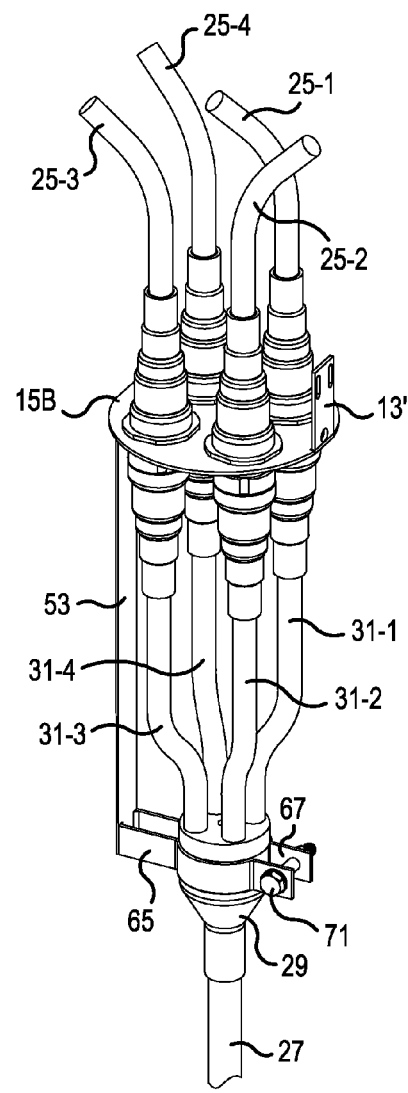
FIG. 14 is a top perspective view of the mounting system of FIG. 13, but with the first connectors mounted to the first plate and the second connectors mated to the first connectors.

FIGS. 13-14 are perspective views of a mounting system 61 in accordance with a third embodiment. The mounting system 61 is the same as the mounting system 51 of FIGS. 10-12, except for modification of the second plate 35A.

The second plate 35A has been replaced by a clamping plates 63. The clamping plates 63 include a first wing 65, which may be integrally formed as a single unitary piece with the beam 53 by a stamping and bending process. The clamping plates 63 also includes a second wing 67, which may be integrally formed as a single unitary piece with the beam 53 by a stamping and bending process. The first and second wings 65 and 67 may include curved profiles, shaped to cradle a recessed ring section 69 (See FIG. 12) of the transition 29. The first and second wings 65 and 67 are drawn together by a bolt 71 and nut 73 combination, so as to clamp onto the recessed ring section 69 of the transition 29.

Since the embodiment of FIGS. 13-14 has vertically oriented clamping plates 63, located at or below the transition 29, the breakout cords 31-1, 31-2, 31-3 and 31-4 are routed directly up to the bottom of the first plate 15B and need not pass through any opening or channel in the clamping plates 63. The second connectors 33-1, 33-2, 33-3 and 33-4 are then mated to the first connectors 21-1, 21-2, 21-3 and 21-4. A housing, similar to the housing 45 described above, may be mounted to the first plate 15B and/or beam 53. The housing would substantially cover an area between the first plate 15B and the clamping plates 63, and may include a lower wall or tapper to close the bottom area adjacent to the transition 29. In practice, the housing 45 may be attached to the first plate 15B and/or the beam 53 by screws 47 and/or abutment tabs 49.

Figure 16:
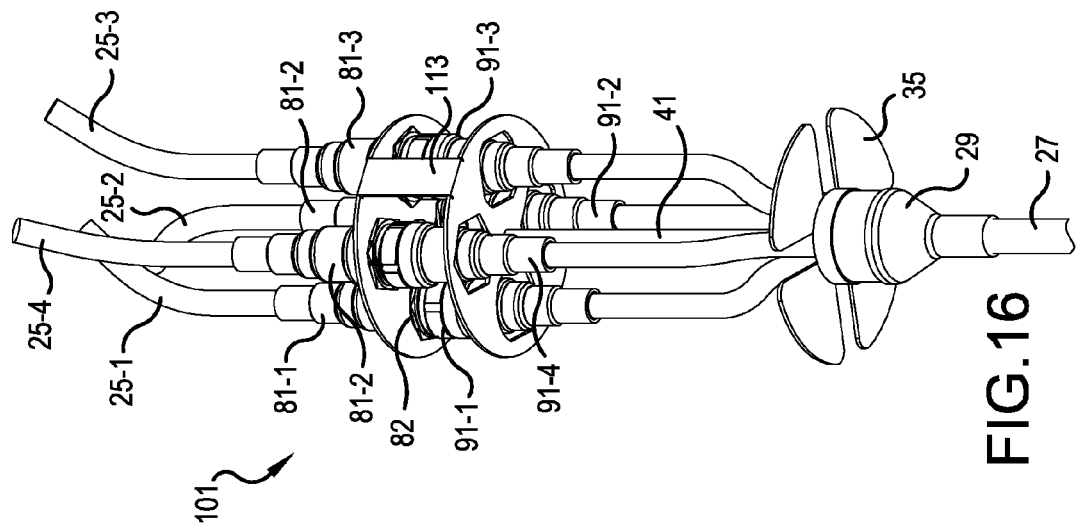
FIG. 16 is a bottom perspective view of a mounting system incorporating the first and third plates of FIG. 15, in accordance with the fourth embodiment of the present invention.
Figure 15:
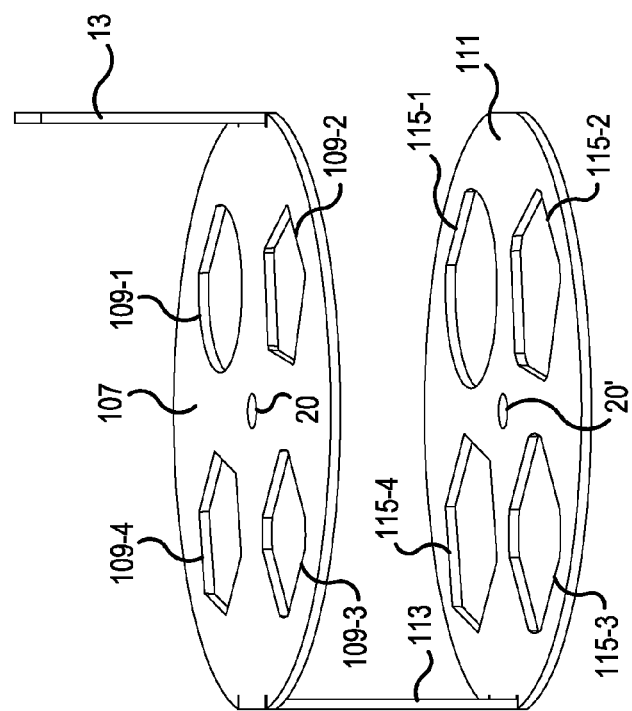
FIG. 15 is a top perspective view of a first plate and a third plate, in accordance with a fourth embodiment of the present invention.

FIGS. 15-20 illustrate a keying aspect of the present invention. FIGS. 15-16 show a fourth embodiment of a mounting system 101 for facilitating ordered mating of plural connectors. The mounting system 101 includes a bracket 13 having at least one feature, e.g., features 19A/B and 20A/B of FIG. 1, for securing the bracket 13 to a pole or wall. A first plate 107 is attached to the bracket 13, e.g., directly connected to or formed integrally with, the bracket 13, as by a stamping and bending process. The first plate 107 has plural mounting positions 109-1, 109-2, 109-3 and 109-4 for securing plural first connectors 81-1, 81-2, 81-3 and 81-4 (See FIG. 16). Each of the plural mounting positions 109-1, 109-2, 109-3 and 109-4 has an inner perimeter shape formed in the first plate 107, which is different than the inner perimeter shapes of the other mounting positions 109 in the first plate 107. The inner perimeter shapes act as keying features to allow only one of a plurality of first connectors 81 to be attached into a particular mounting position 109 in the first plate 107. Although four mounting positions 109 are shown in FIGS. 15-16, more or fewer mounting positions 109 may be included in the first plate 107 to accommodate more or fewer first connectors 81.

A third plate 111 is attached to and spaced from the first plate 107. The one embodiment, the third plate 111 is integrally formed with the first plate 107. A bent section 113 formed at ninety degrees relative to the first plate 107, and at ninety degrees relative to the third plate 111, creates the spacing. The third plate 111 has plural keyholes 115-1, 115-2, 115-3 and 115-4, which are aligned to the plural mounting positions 109-1, 109-2, 109-3 and 109-4, formed in the first plate 107. Each of the plurality of keyholes 115 has an inner perimeter shape formed in the third plate 111, which is different than the inner perimeter shapes of the other keyholes 115 formed in the third plate 111. In a preferred embodiment, the inner perimeter shape of each keyhole 115 matches the inner perimeter shape of the mounting position 109 in the first plate 107 to which the keyhole 115 is aligned, but is slightly larger in size than the inner perimeter shape of the aligned mounting position 109.

The second plate 35 is attached to the first plate 107 in a same or similar manner as described in the preceding embodiments, such as by passing the rod 41 through a third hole 20' formed in the third plate 111 and securing the rod 41 in the first and third through holes 20 and 39 using nuts 43. Likewise, a housing 45 may be installed to protect the breakout cords 31 of the trunk cable 27 in a same or similar manner as described in the preceding embodiments.

Figure 17:
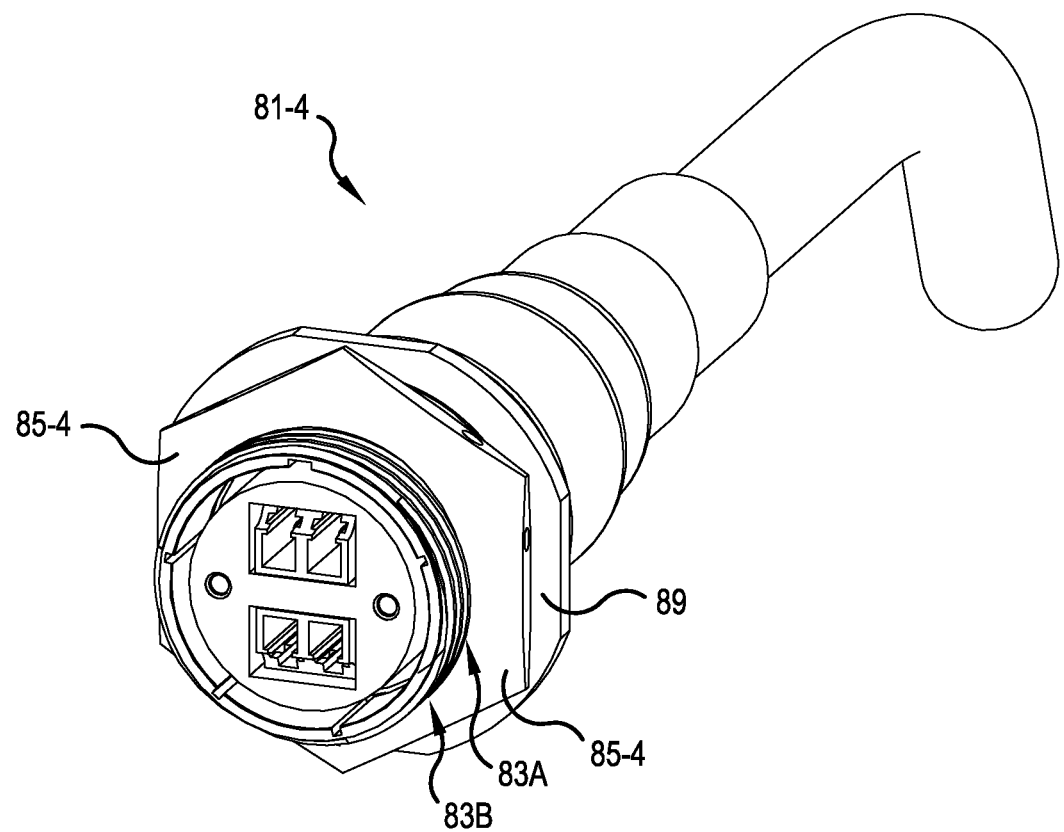
FIG. 17 is a front perspective view of a female hybrid connector with keying features, in accordance with the present invention.

FIG. 17 is a perspective view of a first connector 81-4 of the plurality of first connectors 81, in accordance with the present invention. The first connector 81-4 includes a first threaded portion 83A holding a first nut 85-4 with an outer perimeter having a shape being unique, as compared to the first nuts 85 of other first connectors 81. In the case of the first nut 85-4 shown in FIG. 17, the outer perimeter shape is hexagonal (like the fourth mounting position 109-4). Of course, many other shapes are possible, such as shapes including a pentagon (like the second mounting position 109-2), a square (like the third mounting position 109-3), a circle, a triangle, a circle with at least one flat edge portion (like the first mounting position 109-1), and a circle with evenly or unevenly spaced star tips.

The first connector 81-4 includes a stop flange 89. The first threaded portion 83A is adjacent to the stop flange 89, and the first nut 85-4 is threaded onto the first threaded portion 83A until it abuts the stop flange 89. Then, the first nut 85-4 may be adhered to the stop flange 89 and/or the first threaded portion 83A by an adhesive, e.g., an epoxy.

A second threaded portion 83B may be adjacent, and optionally continuous to, the first threaded portion 83A. The first connector 81-4 is mounted to the first plate 107 by first locating or seating the first nut 85-4 within the corresponding mounting position 109-4 (having the matching hexagonal inner perimeter shape in the case of the fourth mounting position 109-4). Next, a portion of the first plate 107 surrounding the matching inner perimeter shape of the mounting position 109-4 is sandwiched between the stop flange 89 and a second nut 82 threaded onto the second threaded portion 83B. See FIG. 16 for an illustration of the second nut 82. An optional washer may be interposed between the second nut 82 and the first plate 107, if desired.

The embodiment of FIGS. 15-16 shows a keying arrangement, wherein first connectors 81 are allowed to mount only at designated mounting positions 109 in the first plate 107. In other words, the first nut 85 must have a matching shape to the inner perimeter of the mounting position 109 before the first connector 81 will seat into the mounting position 109. By this arrangement, the first connectors 81 may be organized on the first plate 107 by a pre-ordered scheme, and the first plate 107 may be permanently labeled, e.g., by impressions formed into the first plate 107, to indicate the communication channels, power channels or alarm functions to be located at the various mounting positions 109. For example, the first mounting position 109-1 may indicate a first RRU servicing a north facing antenna, the second mounting position 109-2 may indicate a second RRU servicing an east facing antenna, etc.

Figure 19:
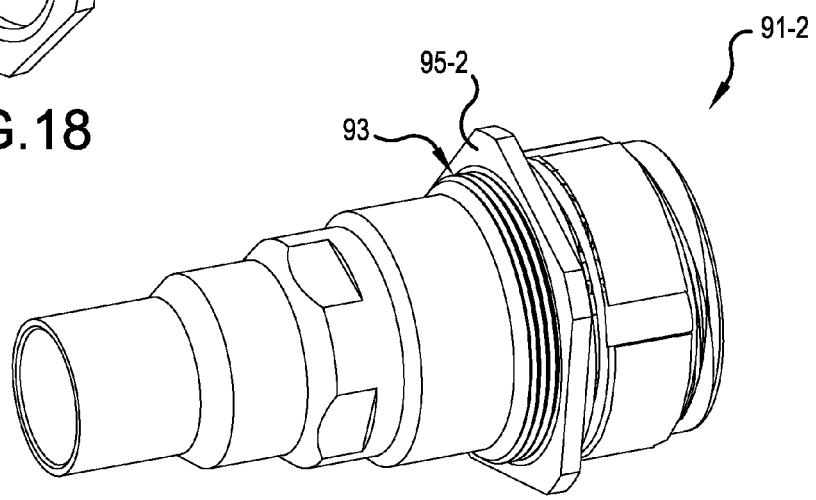
FIG. 19 is a rear perspective view of a male hybrid connector with keying features, in accordance with the present invention.
Figure 20:
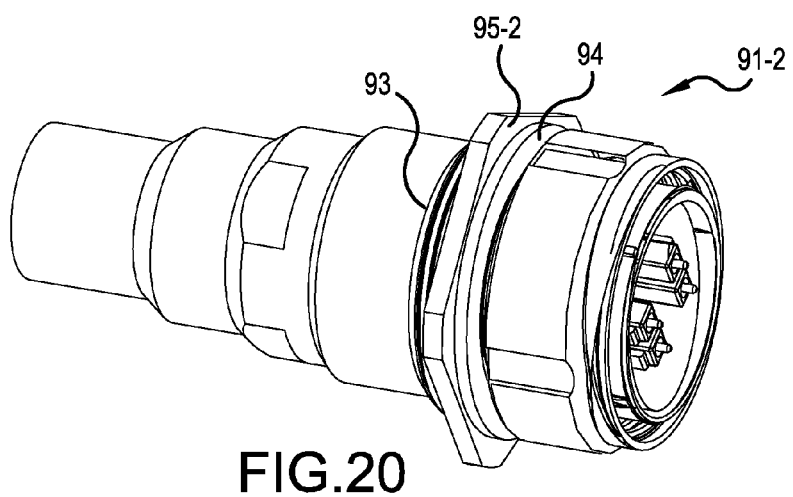
FIG. 20 is a front perspective view of the male hybrid connector of FIG. 19.

FIGS. 19 and 20 show a rear and front perspective view, respectively, of a second connector 91-2 of a plurality of second connectors 91, in accordance with the present invention. Each second connector 91 includes a third threaded portion 93 which extends up to a stop flange 94. The third threaded portion 93 holds a third nut 95. The third nut 95 may be adhered to the third threaded portions 93 and/or the stop flange 94 by an epoxy.

Figure 18:
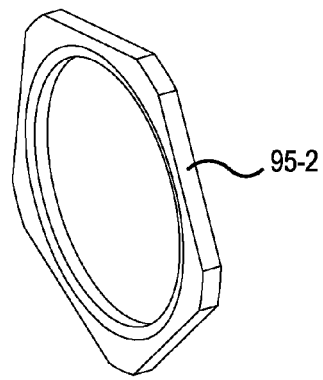
FIG. 18 is a front perspective view of a keying nut for use with the connectors with keying features of the present invention.

The third nut 95 has an outer perimeter having a shape which is unique, as compared to the third nuts 95 of other second connectors 91. In the case of third nut 95-2 in FIGS. 18-20, the outer perimeter shape forms a pentagon (like the second keyhole 115-2), as best seen in FIG. 18's perspective view of the nut 95-2 alone. Of course, many other shapes are possible, such as shapes including a hexagon (like the fourth keyhole 115-4), a square (like the third keyhole 115-3), a circle, a triangle, a circle with at least one flat edge portion (like the first keyhole 115-1), and a circle with evenly or unevenly spaced star tips.

The third nut 95 is slightly larger than the first nut 85, so that the third nut 95 extends outwardly of the stop flange 94, as best seen in FIG. 20. Hence, by making the keyhole 115 slightly larger (as compared to the mounting hole 109), the third nut 95 passes through the keyhole 115 and the stop flange 94 does not contact any portion of the third plate 111, such that the entire second connector 91 passes through the keyhole 115, as best seen in FIG. 16. Once, the second connector 91 passes through the keyhole 115, it may be mated to the first connector 81 in the aligned mounting position 109.

In the fourth embodiment of FIGS. 15-20, keying is taking place with regard to the first connectors 81 and the second connectors 91. The skill of the technician is not being relied upon to determine which second connector 91 should be mated to which first connector 81. Hence, the likelihood of misconnections is greatly reduced.

Only second connectors 91 with a third nut 95 with a shape matching a first nut 85 will be able to pass through the keyhole 115 to mate with a first connector 81 in the aligned mounting position 109. A second connector 91 with a third nut 95 not matching the shape of the first nut 85 on the first connector 81 in the aligned mounting position 109, will be blocked by the perimeter of the keyhole 115, so that a misconnection cannot occur. By this arrangement, the outer perimeter shape of the third nut 95 only permits the second connector 91 to be able to pass through one and only one of the plural keyholes 115.

In the case of the hybrid connectors shown in FIGS. 17 and 19-20, the connector faces include two LC duplex connectors/adapters and two conductive pins/sockets. However, it is within the purview of the present invention to have differently configured connectors, such as fiber optic only connectors, or electrical only connectors. Further, the connectors need not all be the same size or configuration. Examples of differently sized connectors include a small, dedicated, fiber optic connector, e.g. a single SC adapter for an alarm wire, a small, dedicated, electrical connector, e.g., a single pin socket for an alarm wire, a midsized, fiber optic connector, e.g., a duplex LC adapter for communication signaling, a midsized electrical connector, e.g., an RJ-type jack/plug for communication signaling, a larger hybrid connector, e.g., a connector having two LC duplex adapters for communications and three electrical pin sockets for power.

In the above embodiments, the method of assembly shares common steps. The housing 45 is slid over the plurality of first connectors 21/81 and the cables 25 to which the first connectors are associated. The plurality of first connectors are secured to the plural mounting positions 17/17A/109 in the first plate 15, 15A/15B/107. The plurality of second connectors 33/91 are mated to the plural of first connectors. A second or lower plate 35/35A/63 is installed within the breakout cords 35, or adjacent the breakout cords to the transition 29. The housing is slid to a position substantially covering an area between the first and second plates. The housing is secured in place, and a bracket 13/13' is attached to a pole or wall.

Figure 21:
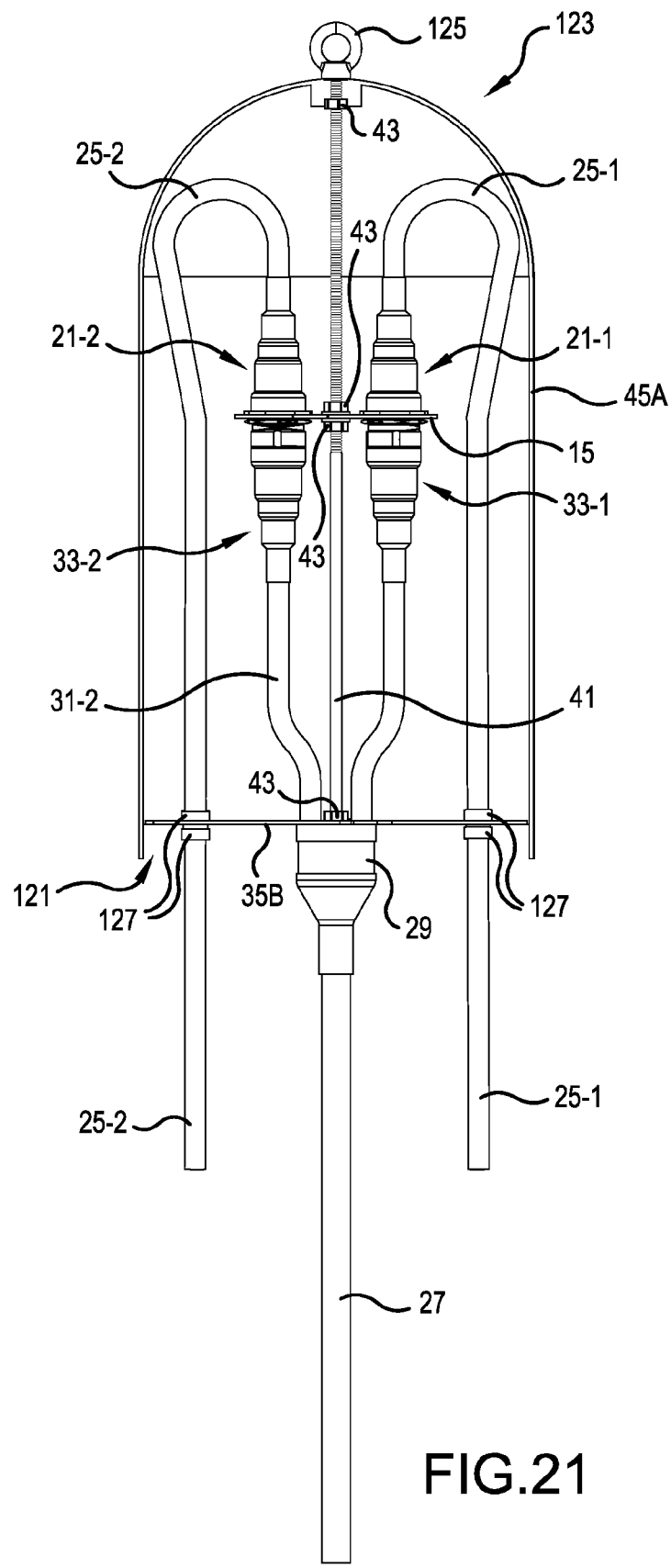
FIG. 21 is a side view, in partial cutaway, of a housing for use with modified versions of any of the first through fourth embodiments of the present invention.

FIG. 21 is a side view, in partial cutaway, illustrating a modified housing 45A. The modified housing 45A may be used with modified versions of any of the first through fourth embodiments of the present invention described above. The modified housing 45A is formed as a cylindrical can with a lower, open end 121 and an upper, closed end 123. The closed end 123 is spaced from the first plate 15 on a side of the first plate 15 opposite the second plate 35B. The open end 121 is located proximate the second plate 35B. In a preferred embodiment, the closed end 123 is dome shaped, as illustrated in FIG. 21, so as to divert rain, snow and debris.

The first cords 25 are rerouted one hundred eighty degrees and may pass back through the first, second, third and fourth openings or channels 37-1, 37-2, 37-3 and 37-4 (See FIG. 6) in the second plate 35B. Grommets 127 may be affixed, e.g., by epoxy, to the first cords 25 and engaged to the edges defining the first, second, third and fourth openings or channels 37-1, 37-2, 37-3 and 37-4, so as to provide a strain relief system. Any pulling force applied to the first cord 25 will be applied to the second plate 35B, rather than the first connector 21.

The second plate 35B is the same of the second plate 35 of FIG. 6, except that the diameter of the second plate 35B is larger, so that the first, second, third and fourth openings or channels 37-1, 37-2, 37-3 and 37-4 are longer and can accommodate the first cords 25, as well as the breakout cords 31-1, 31-2, 31-3 and 31-4, and so that the perimeter of the second plate 35B reaches to the open end 121 of the modified housing 45A.

The modified housing 45A may include a bracket, such as a loop 125 fixed proximate the top of the domed-shaped closed end 123. Alternatively, the modified housing 45A may include a bracket affixed to the outside of the cylindrical portion, e.g., proximate the open end 121. The bracket may be used to attach the modified housing 45A to a pole or wall.

In all embodiments, an optional surge arrestor may be attached to portions of the above structures, e.g., the first plate. The surge arrestor could communicate with one or more connectors located within the plural mounting positions. Grounding regions, with optional grounding bars, may be attached to portions of the above structures, as well. More information on these structures may be found in Applicant's co-pending application, as incorporated by reference in the first paragraph of the specification.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A mounting system for facilitating ordered mating of plural connectors, said mounting system comprising:
   a first plate having plural mounting positions for securing plural first connectors thereto;
   a second plate attached to said first plate by a rod having a first threaded end attached to said first plate and a second threaded end attached to said second plate, wherein said second plate is spaced from said first plate, wherein said second plate has at least one opening or channel to permit at least one cord to pass therethrough;
   a housing extending between said first and second plates and substantially covering an area between said first and second plates; and
   a bracket attached to at least one of said first plate, said second plate or said housing, said bracket having at least one feature for securing said bracket to a pole or wall.

2. The mounting system according to claim 1, wherein said bracket is directly attached to said first plate.

3. The mounting system according to claim 1, wherein said first plate presents a generally circular outer perimeter.

4. The mounting system according to claim 1, wherein said plural mounting positions in said first plate are formed as channels which open to an outer perimeter of said first plate.

5. The mounting system according to claim 1, wherein said housing is formed as a cylinder with a first open end proximate said first plate and a second open end proximate said second plate.

6. The mounting system according to claim 1, wherein said housing is formed as a cylindrical can with an open end and a closed end, said closed end of said cylindrical can being spaced from said first plate on a side of said first plate opposite said second plate, and said open end of said cylindrical can is proximate said second plate.

7. The mounting system according to claim 6, wherein said closed end of said cylindrical can is dome shaped.

8. A mounting system for facilitating ordered mating of plural connectors, said mounting system comprising:
- a first plate means having plural mounting means for securing plural first connectors thereto;
- a second plate means attached to said first plate means by a rod having a first threaded end attached to said first plate means and a second threaded end attached to said second plate means, wherein said second plate means is spaced from said first plate means, and wherein said second plate means has at least one opening or channel to permit at least one cord to pass therethrough;
- a housing means extending between said first plate means and said second plate means and substantially covering an area between said first plate means and said second plate means; and
- a bracket means directly or indirectly attached to at least one of said first plate means, said second plate means or said housing means, said bracket means having at least one feature for securing said bracket means to a pole or wall.

9. The mounting system according to claim 1, wherein said second plate is mounted to a transition and wherein said at least one cord passes through said transition and into a common jacket of a trunk cable.

10. The mounting system according to claim 1, wherein said at least one cord comprises a plurality of cords corresponding in number to said plural mounting positions of said first plate.

11. The mounting system according to claim 10, wherein said second plate is mounted to a transition and wherein each cord of said plurality of cords passes through said transition and into a common jacket of a trunk cable.

12. The mounting system according to claim 8, wherein said second plate means is mounted to a transition and at least one cord passes through said transition and into a common jacket of a trunk cable.

13. The mounting system according to claim 8, wherein said at least one cord comprises a plurality of cords corresponding in number to said plural mounting means of said first plate means.

14. The mounting system according to claim 13, wherein said second plate means is mounted to a transition and wherein each cord of said plurality of cords passes through said transition and into a common jacket of a trunk cable.

* * * * *